United States Patent [19]
Nash

[11] 3,979,067
[45] Sept. 7, 1976

[54] ACTUATING MEANS FOR A THRUST VECTORING GAS TURBINE ENGINE EXHAUST NOZZLE

[75] Inventor: Dudley O. Nash, Forest Park, Ohio

[73] Assignee: General Electric Company, Cincinnati, Ohio

[22] Filed: Apr. 28, 1975

[21] Appl. No.: 572,341

[52] U.S. Cl............................ 239/265.35; 60/230; 244/12 D
[51] Int. Cl.²........................................... F02K 1/20
[58] Field of Search............. 60/230, 232, 271, 204, 60/242; 239/265.33, 265.35, 265.37, 265.39, 265.41, 265.27, 265.43; 244/12 D

[56] References Cited
UNITED STATES PATENTS

| | | | |
|---|---|---|---|
| 3,046,730 | 7/1962 | Petren | 239/265.39 |
| 3,527,408 | 9/1970 | Markowski | 239/265.27 |
| 3,558,058 | 1/1971 | Lennard et al. | 60/230 |

*Primary Examiner*—Carlton R. Croyle
*Assistant Examiner*—Robert E. Garrett
*Attorney, Agent, or Firm*—Robert C. Lampe, Jr.; Derek P. Lawrence

[57] ABSTRACT

A thrust vectoring gas turbine exhaust nozzle is provided with cooperating variable internal coverging-diverging flaps to provide nozzle flow path area control. A vertical take-off and landing capability is obtained by deployment of a rotating bonnet-type deflector which diverts the exhaust stream downward around one side of the exhaust nozzle. Actuating means are provided to rotate the nozzle throat simultaneously with deflector rotation to produce efficient turning of the exhaust stream in the lift mode. The actuation means also simultaneously controls the nozzle flow path area and external exhaust expansion in the cruise mode.

7 Claims, 7 Drawing Figures

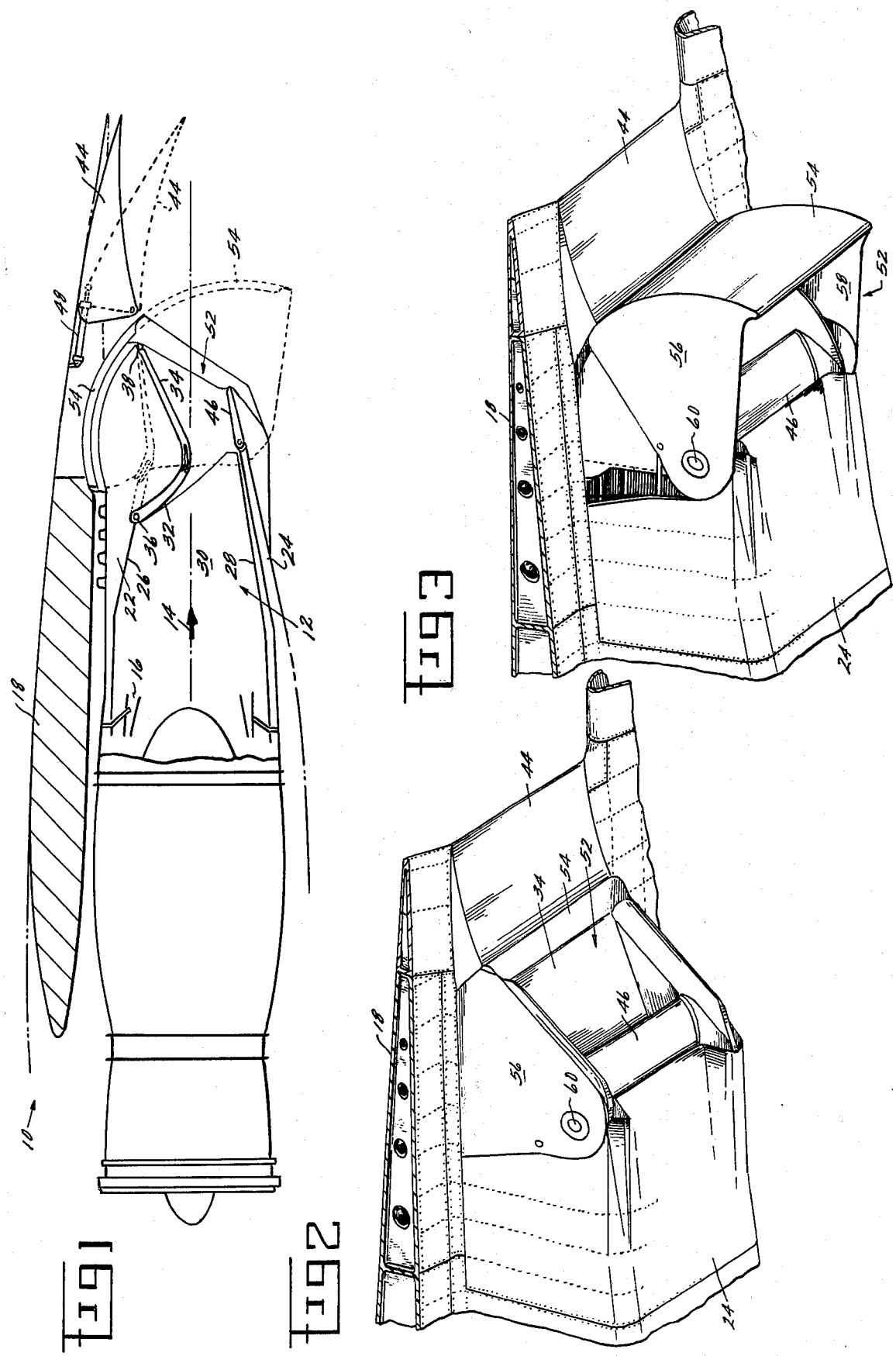

ACTUATING MEANS FOR A THRUST VECTORING GAS TURBINE ENGINE EXHAUST NOZZLE

The invention herein described was made in the course of or under a contract or subcontract thereunder (or grant) with the Department of the Navy.

BACKGROUND OF THE INVENTION

This invention relates to flight maneuverable gas turbine engine exhaust nozzles and, more particularly, to actuating devices for use therein.

The high velocity imparted to the exhaust gases of a gas turbine engine by the exhaust nozzle provides the thrust for propulsion. This thrust is substantially parallel with, and opposite to the direction of, exhaust gases exiting the nozzle. Consequently, if the direction of the exhaust gases is changed, the direction of propulsive thrust is correspondingly varied. Typically, aircraft gas turbine engines are provided with nozzles which are fixed in the axial direction, and aircraft maneuvering is accomplished solely by airframe control surfaces.

Advanced aircraft configurations contemplate, and may even require, the selective redirection (or vectoring) of gas turbine engine thrust in order to enhance aircraft performance and to provide the aircraft with operational characteristics heretofore deemed impractical. For example, if the exhaust of a conventionally installed gas turbine engine was directed downward, rather than rearward, to a direction substantially perpendicular to the engine longitudinal axis, the resulting upward thrust would provide direct lift for the aircraft and, therefore, a vertical take-off and landing capability. Similarly, thrust vectoring during flight can greatly increase aircraft maneuverability since the thrust force can augment the maneuvering forces of the aircraft control surfaces such as elevators, ailerons and rudders. In order to accomplish such thrust vectoring, a device is required to efficiently and practically alter the direction of gas turbine engine exhaust nozzle gases.

The concept of thrust vectoring by itself is not new since exhaust nozzles with this capability have been considered for years, and a wide variety of thrust vectorable nozzles have evolved. However, these nozzles have typically included one or more of the following limitations:

Discontinuous vectoring between the cruise mode and the lift mode;
air frame doors required to accommodate exhaust deflectors in at least one operational mode;
low lift thrust available when compared to the required weight addition of the basic cruise engine;
excessive complexity caused, in part, by a multiplicity of actuators;
excessive downward projection in the lift mode resulting in ground clearance problems; and
slow vector angle and nozzle area rate of variation.

The problem facing the gas turbine engine designer, therefore, is to provide a flight maneuverable exhaust nozzle which avoids all of the above limitations. Copending patent application, Ser. No. 572,340, which is assigned to the same assignee as the present invention, teaches a flight maneuverable nozzle designed to overcome previous design deficiencies and which is incorporated herein by reference. The subject of the present invention is an actuating system for use with that and all similar exhaust nozzles.

SUMMARY OF THE INVENTION

Accordingly, it is the primary object of the present invention to provide an improved actuation system for thrust vectoring, having a reduced number of actuators and which will provide continuous thrust vectoring between vertical take-off (lift), in-flight maneuvering and conventional cruise modes.

It is a further object of this invention to provide a thrust vectorable nozzle actuation system of reduced complexity and which is designed to simultaneously perform several operations.

It is yet another object of this invention to provide an improved method of operating a thrust vectorable nozzle.

These and other objects and advantages will be more clearly understood from the following detailed description, drawings and specific examples, all of which are intended to be typical of rather than in any way limiting to the scope of the present invention.

Briefly stated, the above objectives are accomplished by means of an exhaust device which, in one form, consists of a two-dimensional (substantially rectangular), external expansion-type cruise nozzle with internal area variation provided by cooperating convergent-divergent variable flaps. A variable area ventral flap located downstream of and opposite to the convergent and divergent flaps provides nozzle throat area control in the lift mode and provides expansion area control in the cruise mode.

For vertical take-off and landing or short take-off and landing operation (V/STOL), a rotating bonnet-type deflector is used to deflect the exhaust stream downward. This deflector is stowed externally to the smooth internal flow path during cruise operation so as not to compromise performance and to simplify cooling during afterburning (or "augmented") operation.

An improved actuation device is provided to simultaneously rotate the nozzle throat with deflector rotation to thereby produce efficient turning of the exhaust stream. This is accomplished by operatively connecting the bonnet-type deflector through a cam and link arrangement to the ventral flap to simultaneously control, in a predetermined relationship, the relative positions thereof in the lift mode. Another cam and link arrangement is provided to control the convergent-divergent flaps (and thus the nozzle area) and the ventral flap in the cruise mode.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which is given by way of example with the accompanying drawings, in which:

FIG. 1 diagrammatically depicts a wing-mounted gas turbine engine incorporating the present invention;

FIG. 2 is an isometric view of the exhaust device, associated with the present invention, in a cruise operating mode;

FIG. 3 is an isometric view, similar to FIG. 2, of a wing-mounted exhaust device, associated with the present invention, in a vertical take-off operating mode;

DESCRIPTION OF THE PREFERRED EMBODIMENT

Figure 4:
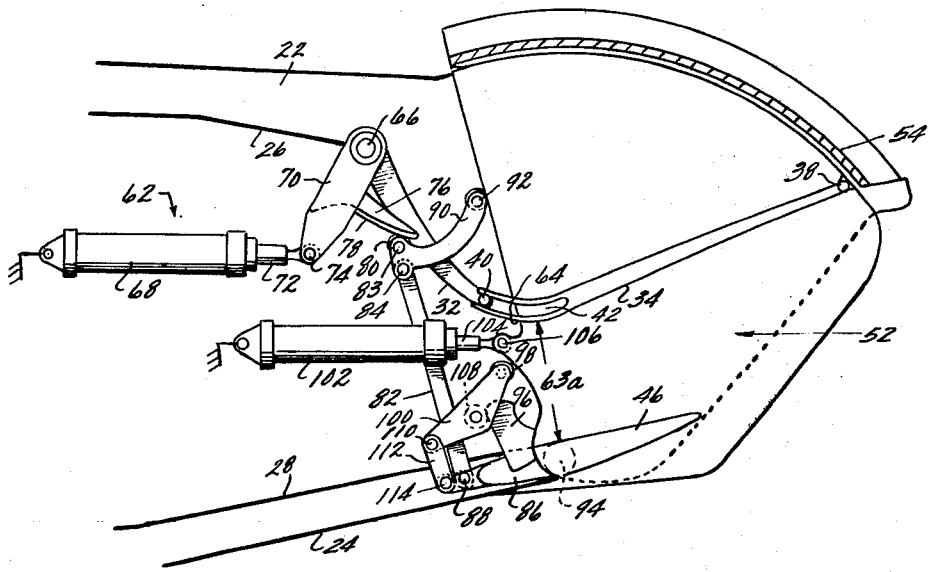
FIG. 4 is a schematic representation of the actuating device of the present invention in a cruise operating mode.

Referring to the drawings wherein like numerals correspond to like elements throughout, attention is first directed to FIG. 1 wherein a gas turbine engine, depicted generally at 10, and which can embody the present invention, is diagrammatically shown. Hot gases of combustion are expanded through a turbine (not shown) in a manner well known in the art and enters exhaust device 12 from the left as depicted by vector 14. (As used hereinafter, the term "exhaust device" is meant to include a fan duct exhaust nozzle, or any other gas turbine engine exhaust nozzle whether or not it is preceded in serial flow relationship by a combustor. In the embodiment of FIG. 1 the gas turbine engine has been augmented by an afterburner 16 of a variety known in the art.) After passing through exhaust device 12 the flow is vectored from the device in a manner described in detail in copending patent application Ser. No. 572,340 which is assigned to the same assignee as the present invention and the disclosure of which is incorporated herein by reference.

As can be readily seen from FIGS. 1, 2 and 3, the exhaust system depicted is of the external expansion type with internal nozzle area variation. Such a configuration can be conformably nested with an aircraft wing 18, for example, to provide an aerodynamically streamlined package and simultaneously provide integration between the variable geometry exhaust device and aircraft wing flap system, thereby eliminating redundancy.

The exhaust device is shown to include two substantially opposed walls 22, 24, the inner surfaces of which (26, 28, respectively) partially define an exhaust stream flow path 30. Wall 22 is further defined by variable nozzle area means comprising cooperating nozzle flaps 32, 34, each hinged at one end, 36, 38, respectively, to wall 22. The other ends are connected, as by cooperating roller 40, and cam 42, arrangement (see FIG. 4). The exhaust stream flow path 30 area is thus controlled, in part, by the positioning of the nozzle flaps.

The variable wing flap 44 located downstream of the nozzle flaps provides flight maneuver vectoring as well as exhaust stream expansion control. As shown, flap 44 comprises a portion of the trailing edge of wing 18, the wing comprising part of the aircraft structure. However, in other embodiments, the flap may be engine- or fuselage-mounted. Flap 44 may be maneuvered by known actuating means 48. A variable area ventral flap 46 which forms the downstream extremity of wall 24, cooperates with nozzle flaps 32 and 34 to control the area of exhaust stream flow path 30 and provides exhaust stream expansion control. Further, as will be discussed hereinafter, ventral flap 46 provides nozzle throat area control in the vertical take-off and landing, and short take-off and landing (V/STOL) modes.

For V/STOL operation, a rotating bonnet-type deflector 52 is used to deflect the exhaust stream downward. Deflector 52 possesses a substantially U-shaped, cross-sectional profile, as most clearly depicted in FIG. 3, and consists of an arcuate deflector portion 54 flanked by two pie-shaped arm members 56, 58. During cruise operation (FIGS. 1 and 2), the deflector 52 is stowed within side wall 22 so that it does not compromise the aerodynamically smooth contours of flow path 30. Thus, it does not affect high cruise nozzle efficiency and simplifies nozzle cooling during augmented (afterburning) operation. In the V/STOL mode, the deflector 52 is rotated about its pivot connections (only one of which is shown at 60) into flow path 30, thereby deflecting the exhaust stream toward the downward direction.

Referring now to FIGS. 4 through 7, an improved actuator means 62 which controls the operation of convergent and divergent flaps 32, 34, respectively, ventral flap 46 and deflector 52 is diagrammatically shown.

Directing attention first to FIG. 4, the nozzle and one form of the actuation means of the present invention are depicted in a cruise mode, without thrust vectoring. It becomes apparent that nozzle area control (control of the internal flow path 30 area) is provided by varying the convergent and divergent flaps (32, 34, respectively) which are connected, as previously noted, by means of a roller 40 and cam 42 arrangement. The nozzle throat, diagrammatically indicated at 63a, in the cruise mode is thus defined, in part, by the arcuate portion 64 of divergent flap 34, since this is the region of minimum cross-sectional area. The forward end of the convergent flap 32 is attached to a drive shaft 66 which is positioned by means of hydraulic actuators 68 (the system is duplicated on each side of exhaust nozzle 12) and drive cranks 70 rigidly attached to each end of the drive shaft 66 and pin-connected to piston rods 72 at 74. While a hydraulic actuator 68 is depicted, it is recognized that other types of actuators may be employed without departing from the scope of the present invention.

The ventral flap 46 must be varied with nozzle pressure ratio during cruise mode operation to provide efficient external expansion of the nozzle flow. This variation is provided simultaneously with the variation of flaps 32 and 34 by means of a cam drive mechanism. The cam 76 is formed on or attached to nozzle area drive crank 70 and has formed thereon a surface (arcuate in the present example) 78 which provides the locus of points necessary to schedule the ventral flap 46 in a predetermined relationship. As the crank 70 and cam 76 are rotated by actuator 68, cam follower 80 and push rod 82 cooperate to position the ventral flap 46 by means of lever 86 which forms an extension of ventral flap 46, and which is connected to push rod 82 at 88. The cam follower 80 and push rod 82 are connected at 83 and 84, respectively, to a bell crank 90 (push rod 82, bell crank 90 and lever 86 comprising a linkage means). This permits the system to essentially pivot about pin connection 92 which is affixed to a non-movable portion of nozzle 12. Thus, it may be considered that the mechanism just described which simultaneously controls the internal flow path 30 area and the position of ventral flap 46 comprises a distinct and integral control means having a significantly reduced number of actuators compared with prior art thrust vectoring nozzles.

Figure 5:
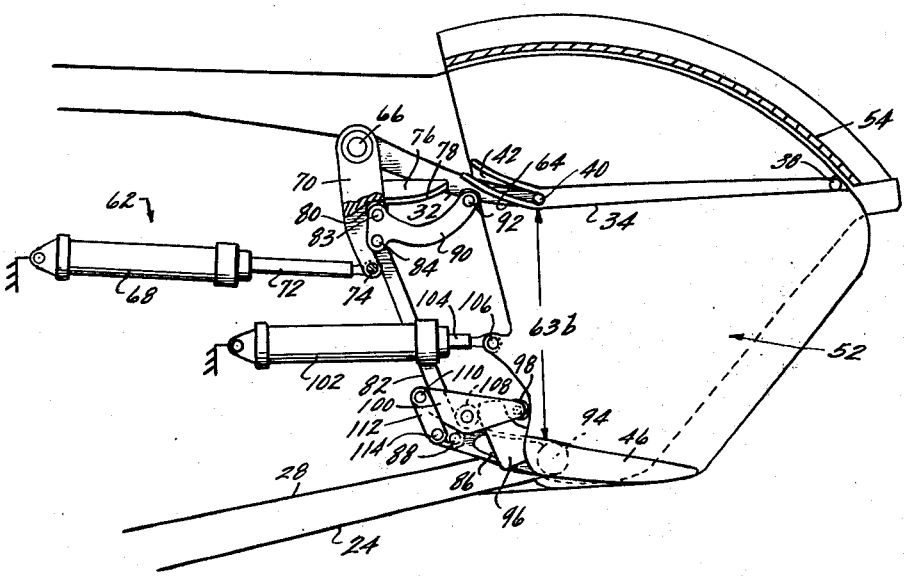
FIG. 5 is a schematic representation, similar to FIG. 4, of the actuating device of the present invention in an afterburning or augmented operating mode.

FIG. 5 depicts the nozzle and the actuator means of the present invention in a different operating mode than FIG. 4. In particular, FIG. 5 is typical of the configuration required for a cruise mode wherein there is afterburning (or augmentation) upstream of the nozzle, as diagrammatically depicted at 16 in FIG. 1. In such an operating mode, it is necessary to increase the nozzle throat area (indicated at 63b) and external exhaust expansion rate. Thus, by operating actuator 68 so as to extend piston rod 72, converging flap 32 and cooperating diverging flap 34 are caused to rotate upward through movement of drive crank 70 and drive shaft 66. Contemporaneously therewith, cam 76 is rotated, thereby permitting the cam follower 80 and push rod 82 to move upward. This causes clockwise rotation of ventral flap 46 about its pivot connection 94 with wall 24, thereby increasing exhaust expansion. Retraction of piston rod 72 causes the sequence to reverse itself. It is thus apparent that for any required nozzle area, the proper ventral flap position is determined and automatically scheduled.

Figure 6:
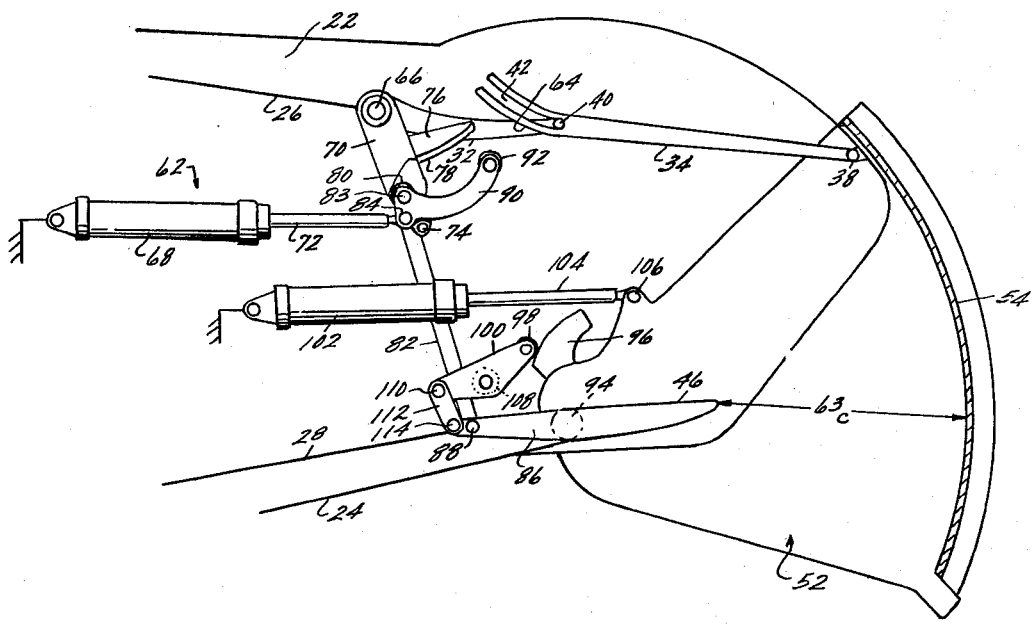
FIG. 6 is a schematic representation, similar to FIG. 4, of the actuating device of the present invention in a vertical take-off mode.
Figure 7:
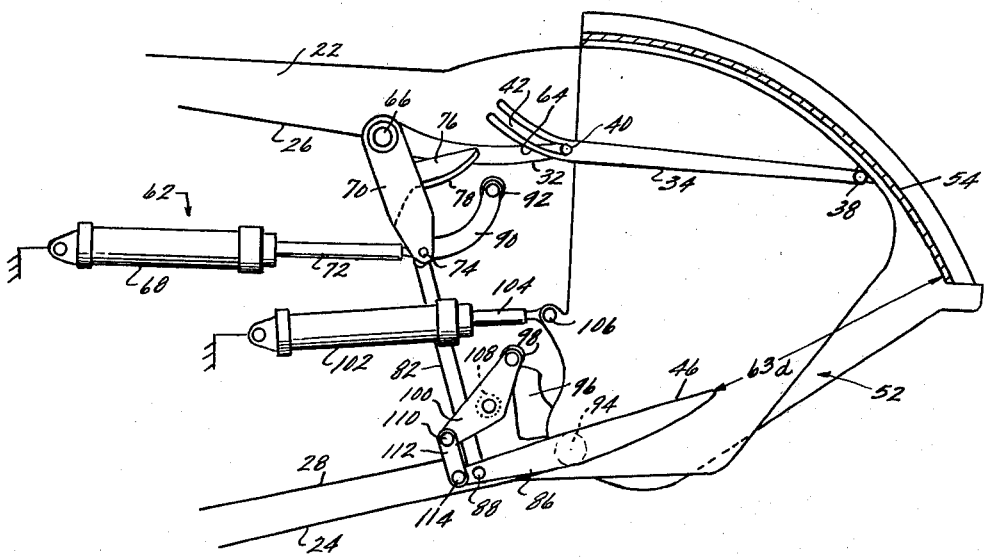
FIG. 7 is a schematic representation, similar to FIG. 4, of the actuating device of the present invention in an intermediate, or short take-off and landing, mode.

Directing attention now to FIGS. 6 and 7, there is schematically disclosed two vectored thrust operating modes. FIG. 6 depicts the nozzle in the vertical take-off mode while FIG. 7 depicts a short take-off and landing (STOL) mode. In both instances, deflector 52 has been deployed, though to a lesser extent in FIG. 7. Thus, in FIG. 6 the thrust vector would be essentially vertically upward for pure lift while in FIG. 7 thrust vector would have some forward component.

It has been found to be desirable to vary the ventral flap 46 position with deflector rotation so as to maintain a constant throat area as the deflector 52 is rotated through the thrust vectoring range. A second cam mechanism provides this motion. Throat area cam 96 is attached to side member 56 of deflector 52. Concerning ourselves again with only one side of the nozzle, it is necessary that cam 96 be contoured to provide the locus of points necessary to position ventral flap 46 in the vectored modes through a linkage arrangement to be described.

Cam 96 engages cam follower 98 (which, in turn, is affixed to cam follower bell crank 100) as the deflector is rotated downward under the action of hydraulic actuator 102 and piston rod 104. Piston rod 104 is operatively connected to deflector 52 as at protuberance 106 upon side member 56. As cam follower 98 is caused to follow cam 96, bell crank 100 is forced to rotate about its pivot connection 108 with a stationary portion of nozzle 12. Attached to bell crank 100 at 110 is a link member 112 which, in turn, is operatively connected to lever 86 at 114, with bell crank 100, link member 112 and lever 86 comprising another linkage means. The action positions the ventral flap 46 as necessary to control the nozzle throat area 63c (which is formed between the ventral flap 46 and deflector 52) and to maximize the thrust throughout the thrust vectoring range.

As shown in FIG. 4 during the cruise mode of operation, the throat area cam 96 is disengaged from cam follower 98 so as not to interfere with the operation of ventral flap 46 through operation of actuator 68. Similarly, as shown in FIG. 6, during deployment of deflector 52 to the lift mode, the convergent and divergent flaps 32, 34, respectively, are opened to their maximum position. With rotation of the deflector 52, cam 76 remains fixed in space such that primary control of ventral flap 46 is provided through cam 96. In fact, in the STOL mode of FIG. 7 wherein the deflector 52 is only partially deployed, cam 76 is disengaged from cam follower 80. The STOL mode of operation is an intermediate mode between the lift mode of FIG. 6 and the cruise mode of FIG. 4 and shows the throat 63d in a partially rotated position. Note that, as in FIG. 6, the piston rod 72 is fully deployed providing maximum area within the nozzle. The throat is rotated with deflector rotation so that the gas flow is turned upstream of the throat at velocity substantially lower than sonic, thereby avoiding serious pressure loss in turn. The present invention provides for the smooth geometry transitions required with a reduced number of actuators. Thus, the actuator means of the present invention provides in one form a control (substantially consisting of actuator 102, cam 96, cam follower 98, bell crank 100, link 112 and lever 86) which permits rotating the deflector 52 and simultaneously positioning ventral flap 46 so as to form a throat between the ventral flap 46 and deflector 52, and also permits rotating the throat with deflector rotation.

Such actuator also provides (through another control means consisting substantially of actuator 68, drive crank 70, cam 76, bell crank 90, cam follower 80, push rod 82 and lever 86) for controlling the nozzle area and exhaust expansion in a cruise mode of operation (augmented or unaugmented).

It will be obvious to one skilled in the art that certain changes can be made to the above-described invention without departing from the broad inventive concepts thereof. For example, as previously noted, actuators of other than the hydraulic variety may be provided. Furthermore, a slightly modified actuator arrangement may still provide for controlling the position and movement of the deflector means and the throat with one control means in the lift mode of operation, and provide through a second control means for simultaneously controlling the nozzle area and exhaust expansion in a cruise mode of operation. It is intended that the appended claims cover these and all other variations in the present invention's broader inventive concepts.

Having thus described the invention what is claimed as novel and desired to be secured by Letters Patent of the United States is:

1. In a gas turbine engine flight maneuverable exhaust nozzle including a plurality of substantially opposed walls partially defining an exhaust stream flow path; variable position convergent-divergent means partially defining a first of said walls; deflector means positionable between a stowed position external to the exhaust stream flow path and a deployed position further defining the exhaust stream flow path; and a variable position ventral flap partially defining a second of said walls, the improvement comprising:

first actuation means for positioning said convergent-divergent means;

second actuation means for deploying said deflector means;

first cam and follower means operatively connecting said convergent-divergent means and said ventral flap for providing simultaneous relative movement thereof when said deflector means is stowed; and second cam and follower means operatively connecting said deflector means and said ventral flap for providing simultaneous relative movement thereof, said second cam and follower means overriding said first cam and follower means to reposition said ventral flap when said deflector means is deployed.

2. In a gas turbine engine flight maneuverable exhaust nozzle including a plurality of substantially opposed walls partially defining an exhaust stream flow path having a throat; variable position convergent-divergent means partially defining a first of said walls; deflector means positionable between a stowed position external to the exhaust stream flow path and a deployed position further defining the exhaust stream flow path; and a variable position ventral flap partially defining a second of said walls, the improvement comprising:
first actuation means for positioning said variable position convergent-divergent means;
a first cam incorporated with said variable position convergent-divergent means and initially engaging a first cam follower connected to said ventral flap, wherein the first cam contour is such that the ventral flap is positioned to provide efficient external expansion of the exhaust stream in cooperation with said convergent-divergent means;
second actuation means for positioning said deflector means; and
a second cam incorporated with said deflector means, and a second cam follower operatively connected to said ventral flap, said second cam initially disengaged from said second cam follower when said deflector means is stowed, and subsequently engaged therewith so as to override said first cam follower and reposition said ventral flap when said deflector means is deployed to provide for efficient throat rotation as said deflector means is deployed.

3. The improved gas turbine engine flight maneuverable exhaust nozzle as recited in claim 2 wherein the throat is positionable between a first location partially defined by said convergent-divergent means and a second location partially defined by said deflector means and said ventral flap.

4. The improved gas turbine engine flight maneuverable exhaust nozzle as recited in claim 2 wherein said convergent-divergent means comprises a pair of cooperating variable position convergent-divergent flaps.

5. The improved gas turbine engine flight maneuverable exhaust nozzle as recited in claim 4 wherein said first cam is connected to the variable position convergent flap.

6. In a gas turbine engine flight maneuverable exhaust nozzle including a plurality of substantially opposed walls partially defining an exhaust stream flow path having a throat; variable position convergent-divergent means partially defining a first of said walls; deflector means positionable between a stowed position external to the exhaust stream flow path and a deployed position further defining the exhaust stream flow path; and a variable position ventral flap partially defining a second of said walls, the improvement comprising:
a first cam incorporated with said deflector means, and a first cam follower operatively connected to said ventral flap, said first cam initially disengaged from said first cam follower when said deflector means is stowed and subsequently engaged therewith when said deflector means is deployed to provide for efficient throat rotation as said deflector means is deployed.

7. The improved gas turbine engine flight maneuverable exhaust nozzle as recited in claim 6 further comprising:
actuation means for positioning said variable position convergent-divergent means; and
a second cam incorporated with said variable position convergent-divergent means and initially engaging a second cam follower connected to said ventral flap; wherein:
the contour of said second cam is such that the ventral flap is positioned to provide efficient external expansion of the exhaust stream in cooperation with said convergent-divergent means when said deflector means is stowed; and
the contour of said first cam is such as to override said second cam follower and reposition said ventral flap when said deflector means is deployed to provide for efficient throat rotation simultaneous therewith.

* * * * *